Aug. 5, 1947.                K. W. PFLEGER                2,425,002
                           ELECTRICAL APPARATUS
                           Filed July 8, 1944           3 Sheets-Sheet 1

INVENTOR
K. W. PFLEGER
BY
ATTORNEY

Aug. 5, 1947.  K. W. PFLEGER  2,425,002
ELECTRICAL APPARATUS
Filed July 8, 1944  3 Sheets-Sheet 2

INVENTOR
K. W. PFLEGER
BY
*H. A. Burgess*
ATTORNEY

INVENTOR
K. W. PFLEGER
BY
ATTORNEY

Patented Aug. 5, 1947

2,425,002

UNITED STATES PATENT OFFICE 2,425,002

ELECTRICAL APPARATUS

Kenneth W. Pfleger, Arlington, N. J., assignor to Bell Telephone Laboratories, Incorporated, New York, N. Y., a corporation of New York Application July 8, 1944, Serial No. 544,094

6 Claims. (Cl. 179—175.31)

1

This invention relates to a signal transmission system embodying a transmission line, and particularly to an arrangement for continuously indicating the gain of such line.

The general object of the invention is to indicate the gain of a signal transmission circuit in terms of the ratio of the voltages effective at the input and output thereof.

In a specific embodiment, the present invention comprises a pair of amplifiers each of which is connected to one of two spaced points in a signal transmission circuit between which points the gain is to be continuously indicated. The output of one amplifier is applied to the input of a variable attenuating network including resistors having preselected resistance versus current characteristics whose effective resistance is controlled by the output of the second amplifier. An indicating device connected to the output of the attenuating network indicates continuously the gain of the line in terms of the ratio of the signal voltages at the two spaced points of the circuit.

One feature involves the indication of gain in terms of the ratio of the input voltage to the output voltage. Another feature concerns the indication of gain in terms of the ratio of the output voltage to the input voltage. A further feature relates to a meter indication which is proportional to the circuit gain regardless of variations in the magnitude of the signal current flowing in the circuit. Another feature involves a meter indication which is proportional to the circuit gain when such gain is constant.

Figure 1:
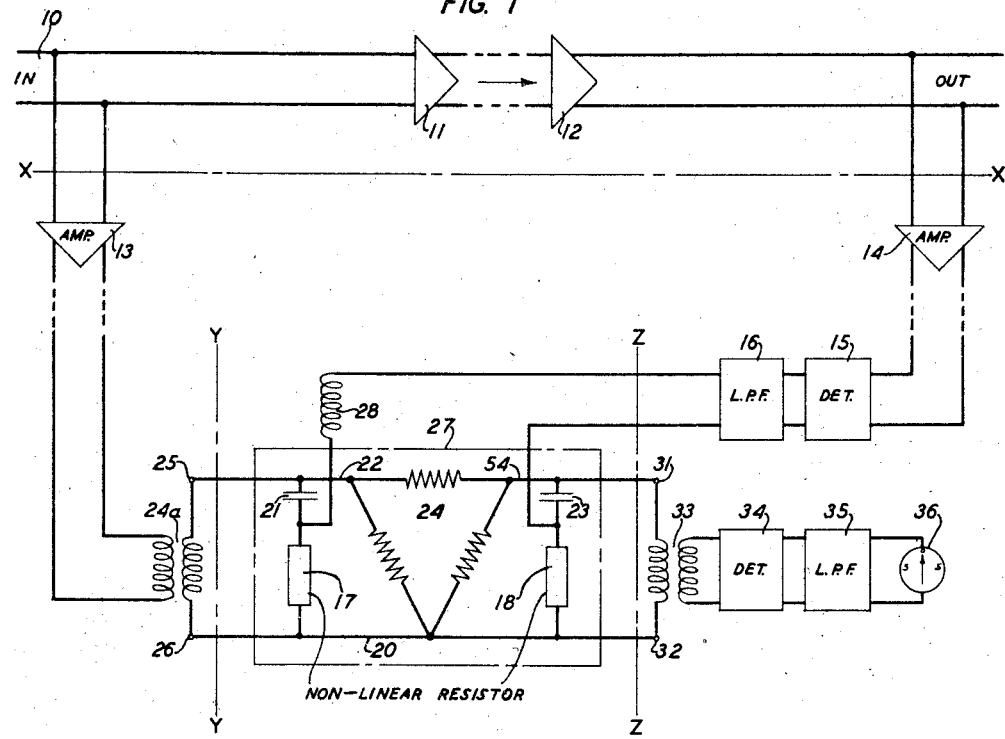

The invention will be readily understood from the following description taken together with the accompanying drawing, in which:

Fig. 1 is a schematic circuit illustrating a specific embodiment of the invention; and Figs. 2, 3, 4, 5, 6 and 7 are modifications to be substituted in Fig. 1.

Referring to Fig. 1, a long signal transmission line 10 usually embodies at least two spaced repeaters 11 and 12 arranged to operate in the direction indicated by the arrow, and may comprise a telephone loop, a carrier telegraph circuit, a program network, or the like. A one-way amplifier 13 is connected to the input circuit of repeater 11, and a one-way amplifier 14 to the output circuit of repeater 12. These amplifiers have high-impedance input circuits so as to cause a minimum diversion of signal energy from the line 10. The output of amplifier 14 is applied through a detector 15, low-pass filter 16 and a choke coil 28 to corresponding ends of resistors

2

17 and 18, such as silicon carbide or the like, each of which has a non-linear resistance versus direct-current characteristic. The opposite ends of the resistors 17 and 18 are joined by a lead 20. Thus, the resistors 17 and 18 are connected in series in the rectified current circuit including the output of the detector 15.

A capacitor 21 is interposed between the upper terminal of resistor 17 and a lead 22, and a capacitor 23 is disposed between the upper terminal of resistor 18 and lead 54. A resistance network 24 is connected between the leads 20, 22 and 54 at a point intermediate the circuit branches 17, 21 and 18, 23. The left-hand ends of the leads 20 and 22 are joined to input terminals 25 and 26, respectively, and the right-hand ends of the leads 20 and 54 are connected to output terminals 31 and 32, respectively. Capacitors 21 and 23 restrict the flow of rectified current to the series circuit including both resistors 17 and 18; and the choke coil 28 and low-pass filter 16 preclude the leak of alternating current signal into the circuit branch including detector 15. The resistors 17 and 18, capacitors 21 and 23, and resistance network 24 constitute an automatically variable attenuator 27 whose operation will be presently explained.

The output of amplifier 13 is applied through transformer 24a to input terminals 25 and 26 of the attenuator 27 which has its output terminals 31 and 32 connected through a transformer 33, a detector 34, and a low-pass filter 35, in sequence, to an indicator 36. Thus the resistors 17 and 18 are individually connected in shunt of the alternating current path between input and output terminal pairs 25 and 26, and 31 and 32, respectively, but in series with each other in the rectified current path in the output circuit of the detector 15 as previously mentioned.

The operation of the circuit in Fig. 1 will now be described. Amplifier 13 supplies a signal voltage ($k_1V_1$) to the input terminals 25 and 26 of the attenuator 27, where $k_1$ is a constant and $V_1$ is the amplitude of the signal voltage at the inputs of both repeater 11 and amplifier 13. Amplifier 14 delivers signal voltage ($k_2V_2$) to detector 15, where $V_2$ is the amplitude of the signal voltage at the output of repeater 12 and the input of amplifier 14 and $k_2$ is a constant. This detector supplies a rectified current ($k'_2V_2$), where $k'_2$ is a factor, to the resistors 17 and 18 for controlling the effective resistance thereof. As the rectified current in the output of the detector 15 tends to increase, the effective resistance of both shunt resistors 17 and 18 tends to decrease, and thereby to shunt an increased amount of signal current therethrough; and as such rectified current tends to decrease the effective resistance of resistors 17 and 18 tends to increase and thereby to shunt a decreased amount of signal current therethrough. Thus, the transfer admittance of attenuator 27 is substantially inversely proportional to the amplitude of the signal voltage $V_2$ or the amount of rectified current in the output of detector 15.

In the output of attenuator 27, the detector 34 supplies a rectified current signal $$\left(k_3 \frac{V_1}{V_2}\right)$$

to the indicator 36, where $k_3$ is a constant. Thus, the rectified current in the output of detector 34 produces on the indicator 36 a reading which is proportional to the voltage ratio $$\left(\frac{V_1}{V_2}\right)$$

that is, the ratio of the amplitude of the signal voltage at the input of the line 10 or repeater 11 to the amplitude of the signal voltage at the output of the line 10 or repeater 12. This proportionality holds true when both detectors 15 and 34 have a linear voltage versus current characteristic and when both resistors 17 and 18 cause the transfer admittance of attenuator 27 for alternating current to vary in inverse proportion to the rectified current supplied thereto by the detector 15. Usually detectors have some non-linearity so that $(k'_2)$ is not constant. Then, it is necessary to preselect the parameters of detectors 15 and 34 and attenuator 27 so as to approximate closely the desired proportionality for the output of detector 34. In order that the resistors 17 and 18 shall not change their effective resistance values appreciably with variations in the signal voltage $V_1$, it is desirable to make the constant $(k_1)$ small and the factor $(k'_2)$ large by using suitable gains for both amplifiers 13 and 14. The optimum dimensions for the elements in attenuator 27 can be readily determined for a given case on an empirical basis.

In order to provide substantially equal envelope delay from the input of line 10 up to the attenuator 27 over both paths, the first path including amplifier 13 and the second path including the line 19, amplifier 14, detector 15, low-pass filter 16, and choke coil 28, a suitable delay network, not shown, should be inserted in the output of amplifier 13, if the delay inequality without it is great enough to cause unsteady readings on indicator 36. A delay network may be unnecessary when the line is short or the indicator 36 has sufficient damping.

The readings of indicator 36 may be calibrated in terms of voltage ratio, or decibels. The indicator 36 may be calibrated by connecting the input circuits of both amplifiers 13 and 14 to the same source of alternating current, and then adjusting the gains of these amplifiers until the reading on the indicator 36 shows unity voltage ratio or zero decibels, when the line transmits a suitable magnitude of signal current as hereinafter mentioned.

Figure 2:
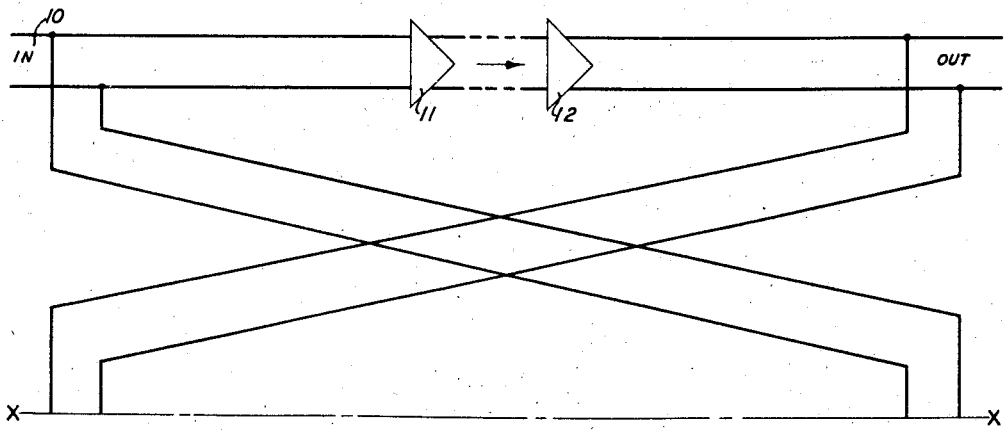

Fig. 2 shows how the circuit of Fig. 1 can be modified to indicate $$\left(\frac{V_2}{V_1}\right)$$

that is, the ratio of the amplitude of the signal voltage at the output of line 10 or repeater 12 to the amplitude of the signal voltage at the input of line 10 or repeater 11. In this connection, it will be understood that the circuit portion of Fig. 2 is to be substituted for the circuit portion shown above the line X—X in Fig. 1. Thus, the input circuit of amplifier 13 is connected to the output circuit of repeater 12, and the input circuit of amplifier 14 is connected to the input circuit of repeater 11. The operation of the combined circuit of Figs. 1 and 2 is the same as that described above for Fig. 1 alone, except now the transfer admittance of attenuator 27 is inversely proportional to the amplitude of the signal voltage $V_1$ or the amount of rectified current in the output of detector 15, and reading on the indicator 36 is proportional to the voltage ratio $$\left(\frac{V_2}{V_1}\right)$$

Thus, the indicator 36 provides a reading which is proportional to the gain of the line 10 regardless of variations in the magnitude of the signal current flowing thereon, and which is proportional to the gain of the line 10 when such gain is either constant or variable. The range of signal current magnitudes for which this relationship holds true, is, of course, not infinite. Obviously, the indicator 36 will not register in the absence of signal current. However, by suitably designing the resistors 17 and 18 and the other parts of the circuit in Fig. 1, it should be possible to closely approximate the desired relationship over a considerable range of signal current magnitudes, and thus to test a working circuit without removing it from service, when at least a small alternating signal current flows therein. Alternately, the indicator 36 can be of the alternating current type connected directly to the attenuator output terminals 31 and 32 and having a deflection characteristic proportional to $$\left(k_3 \frac{V_1}{V_2}\right) \text{ or } \left(k_3 \frac{V_2}{V_1}\right)$$

Figure 3:
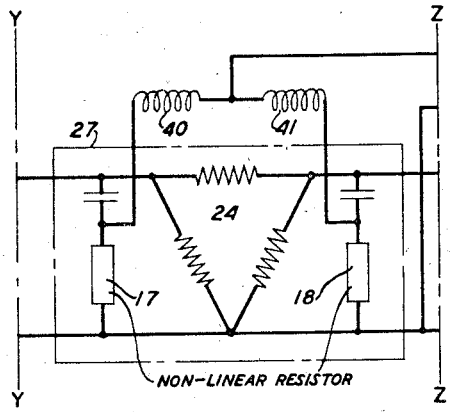

In Fig. 3 which may be substituted between the lines Y—Y and Z—Z in Fig. 1, the resistors 17 and 18 are connected in parallel in rectified current path including the output of detector 15. Choke coils 40 and 41 and low pass filter 16 preclude the leak of alternating signal current into the circuit branch including detector 15. The modification including Figs. 1 and 3 operates in the manner of Fig. 1 explained above.

Figure 4:
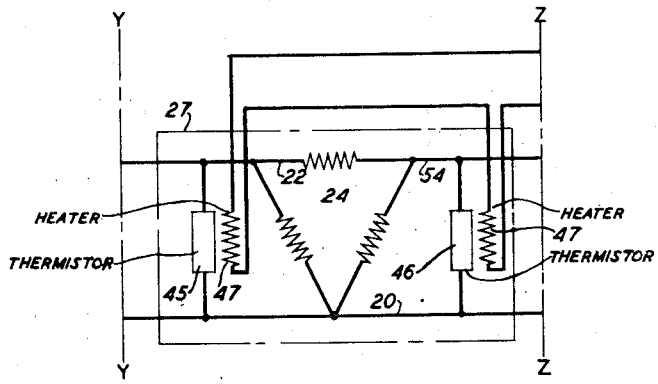

In Fig. 4 which may be substituted between the lines Y—Y and Z—Z in Fig. 1, thermistors 45 and 46 are provided with preselected negative temperature coefficients of resistance and connected in shunt of the leads 20 and 22 and 20 and 54, respectively, so as to be separated by the resistance network 24. Associated with each thermistor is a heating coil 47, both such coils being connected in series in the rectified current path including the output of detector 15. Obviously, these heating coils may also be connected in parallel in such path. A thermistor is resistance material whose effective resistance varies greatly with temperature. The modification including Figs. 1 and 4 operates in the manner of Fig. 1 as above explained.

Figure 5:
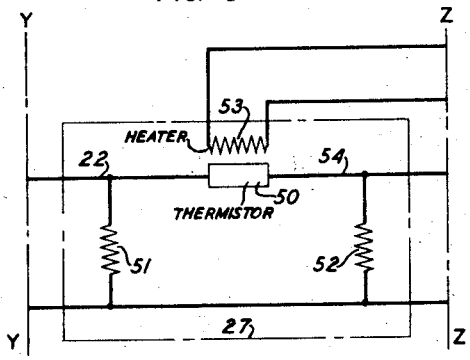

In Fig. 5 which may be substituted between the lines Y—Y and Z—Z in Fig. 1, a thermistor 50 is provided with a pre-selected positive temperature coefficient of resistance and interposed in series between the leads 22 and 54. This thermistor is flanked on both sides by shunting resistors 51 and 52, each of which possesses a fixed resistance characteristic and extends across leads 20 and 22 and 20 and 54 respectively. A heating coil 53 operates the thermistor 50 by means of the rectified current supplied by the detector 15.

The operation of Fig. 1 as modified with Fig. 5 is as follows: As the amount of rectified current supplied by detector 15 tends to increase the heating effect of heating coil 53 tends to increase in a proportionate manner and thereby to increase the effective resistance of thermistor 50. This tends to increase the attenuating effect of attenuator 27 with reference to the signal current supplied by the amplifier 13. On the other hand, as the amount of rectified current supplied by the detector 15 tends to decrease, the heating effect of heating coil 53 tends to decrease in a proportionate manner and thereby to decrease the effective resistance of thermistor 50. This tends to decrease the attenuating effect of attenuator 27 with reference to the signal current supplied by the amplifier 13. Thus, the transfer admittance of attenuator 27 is substantially inversely proportional to the amount of rectified current in the output of detector 15. The detector 34, Fig. 1, produces rectified current which is proportional to $$\left(\frac{V_1}{V_2}\right)$$

which has been hereinbefore explained. When Fig. 1 is modified to include both Figs. 2 and 5, the detector 34 produces rectified current which is proportional to the voltage ratio $$\left(\frac{V_2}{V_1}\right)$$

In connection with Fig. 5, it is obvious that the detector 15 and low-pass filter 16 can be omitted so that the alternating current output of amplifier 13 or 14 can be applied directly to the heating coil 53.

Figure 6:
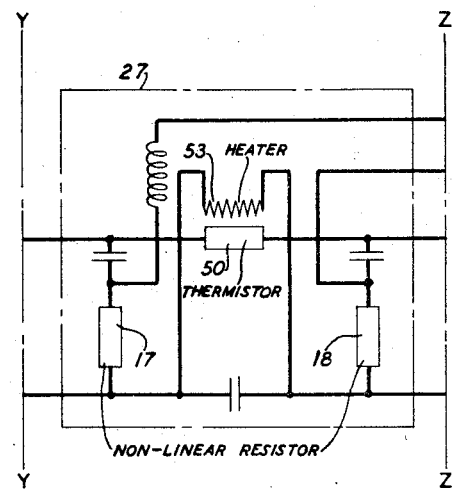
Figure 7:
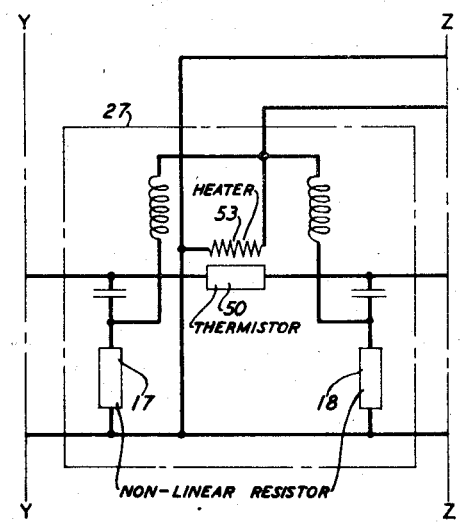

Fig. 6 illustrates a combination of Figs. 1 and 5, wherein the resistors 17 and 18 and thermistor 50 are connected in series in the rectified current path including the output of detector 15; and Fig. 7 illustrates a combination of Figs. 3 and 5 wherein the resistors 17 and 18 and thermistor 50 are connected in parallel in the rectified current path including the output of detector 15. Obviously, Figs. 6 and 7 can be interposed in Fig. 1 or in Fig. 1 as modified with Fig. 2 by substitution between the lines Y—Y and Z—Z.

The operation of Fig. 6 in Fig. 1 is as follows: As the amount of rectified current supplied by detector 15 tends to increase, the effective resistance of resistors 17 and 18 tends to decrease and that of thermistor 50 to increase; and as the amount of the rectified current in the output of detector 15 tends to decrease, the effective resistance of resistors 17 and 18 tends to increase and that of thermistor 50 to decrease. Thus, the transfer admittance of attenuator 27 is substantially inversely proportional to the amount of rectified current in the output of detector 15. Accordingly, the detector 34 effects rectified current which is proportional to the voltage ratio $$\left(\frac{V_1}{V_2}\right)$$

When Fig. 1 is modified to include both Figs. 6 or 7, the detector 34 produces rectified current which is proportional to the voltage ratio $$\left(\frac{V_2}{V_1}\right)$$

The line 10 and repeaters 11 and 12 constitute a specific electrical transducer with which the present invention is used for the purpose of this description, and it is to be understood that the invention is not limited thereto but can be utilized equally as expeditiously with various types of electrical transducers.

What is claimed is:

1. In combination in apparatus for continuously indicating the gain of a signal transmission line in terms of the ratio of the amplitudes of the signal voltages effective at two spaced points on said line, variable attenuating means comprising an input and an output terminal pair and resistance means having a preselected resistance versus current characteristic for controlling the effect of said attenuating means, means for supplying a portion of an electrical signal voltage effective at one point on said line to said input terminal pair, means for utilizing a portion of the signal voltage effective at the second point on said line for varyingly energizing said resistance means and thereby varying the effect of said attenuating means, and means connected to said output terminal pair for continuously indicating the gain between the one and second points on said line in terms of the ratio of the amplitude of the signal voltage effective at the one point to the amplitude of the signal voltage effective at the second point.

2. The combination according to claim 1 in which said supplying means supplies signal voltage from the input of said line to said input terminal pair of said attenuating means, said utilizing means utilizes the signal voltage from the output of said line for energizing said resistance means, and said indicating means indicates continuously the gain between the input and output of said line in terms of the ratio of the amplitude of the signal voltage at the input of said line to the amplitude of the signal voltage at the output of said line.

3. The combination according to claim 1 in which said supplying means supplies signal voltage from the output of said line to said input terminal pair of said attenuating means, said utilizing means utilizes the signal voltage from the input of said line for energizing said resistance means, and said indicating means indicates continuously the gain between the output and input of said line in terms of the ratio of the amplitude of the signal voltage at the output of said line to the amplitude of the signal voltage at the input of said line.

4. In combination in a system for continuously indicating gain in terms of the ratio of the amplitudes of two signal voltages each of which is effective at one of two spaced points on a signal transmission line, two amplifiers having input circuits of high impedance, each amplifier having its input circuit connected to one of said two points, a variable attenuating network comprising an input and an output terminal pair and at least one element provided with a preselected resistance versus current characteristic, means for applying the output of one amplifier to said input terminal pair, means for utilizing the output of the second amplifier for varyingly energizing said resistance element and thereby varying the attenuating effect of said attenuating network, and means connected to said output terminal pair for continuously indicating the gain between said two points in terms of the ratio of the amplitude of the signal voltage at the input circuit of one amplifier to the amplitude of the signal voltage at the input circuit of the second amplifier.

5. A combination in a system according to claim 4 in which the input circuit of said one amplifier is connected to an input point of said line, and the input circuit of said second amplifier is connected to an output point of said line.

6. A combination in a system according to claim 4 in which the input circuit of said one amplifier is connected to an output point of said line, and the input circuit of said second amplifier is connected to an input point of said line.

KENNETH W. PFLEGER.

REFERENCES CITED

The following references are of record in the file of this patent:

UNITED STATES PATENTS

| Number | Name | Date |
|---|---|---|
| 2,324,215 | Kinsburg | July 13, 1943 |
| 2,054,906 | Lewis | Sept. 22, 1936 |
| 1,755,244 | Dietze | Apr. 22, 1930 |

FOREIGN PATENTS

| Number | Country | Date |
|---|---|---|
| 482,103 | Great Britain | Mar. 23, 1938 |